US 8,559,510 B2

(12) United States Patent
Hosokawa

(10) Patent No.: US 8,559,510 B2
(45) Date of Patent: Oct. 15, 2013

(54) IMAGE DECODING APPARATUS

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 12/306,835

(22) PCT Filed: Aug. 9, 2007

(86) PCT No.: PCT/JP2007/065919
§ 371 (c)(1),
(2), (4) Date: Dec. 29, 2008

(87) PCT Pub. No.: WO2008/018626
PCT Pub. Date: Feb. 14, 2008

(65) Prior Publication Data
US 2009/0316782 A1 Dec. 24, 2009

(30) Foreign Application Priority Data

Aug. 10, 2006 (JP) ................. 2006-218820

(51) Int. Cl.
H04N 7/12 (2006.01)
H04N 11/02 (2006.01)
H04N 11/04 (2006.01)

(52) U.S. Cl.
USPC .................................. 375/240.13

(58) Field of Classification Search
None
See application file for complete search history.

(56) References Cited

U.S. PATENT DOCUMENTS

| | | | |
|---|---|---|---|
| 5,561,465 A | 10/1996 | Fautier et al. | |
| 5,909,224 A | 6/1999 | Fung | |
| 6,049,570 A * | 4/2000 | Fukunaga et al. | 375/240.12 |
| 6,393,152 B2 * | 5/2002 | Takahashi et al. | 382/233 |
| 6,621,868 B1 * | 9/2003 | Kimata et al. | 375/240.27 |
| 6,757,332 B1 * | 6/2004 | Kadono | 375/240.25 |
| 6,798,839 B2 * | 9/2004 | Iwata et al. | 375/240.28 |
| 7,154,948 B2 * | 12/2006 | Kang et al. | 375/240.01 |
| 7,379,498 B2 * | 5/2008 | Fu et al. | 375/240.12 |

(Continued)

FOREIGN PATENT DOCUMENTS

| | | |
|---|---|---|
| EP | 1011270 A | 6/2000 |
| JP | 2005-260588 A | 9/2005 |
| WO | 2004-053842 A | 6/2004 |

OTHER PUBLICATIONS

PCT/IPEA/416 and PCT/IPEA/409 which comprise an International Preliminary Report on Patentability for PCT/JP2007/065919.

*Primary Examiner* — Eleni Shiferaw
*Assistant Examiner* — Jing Sims
(74) *Attorney, Agent, or Firm* — Cowan, Liebowitz & Latman, P.C.

(57) ABSTRACT

An access unit to be decoded is selected from data stored in a coded picture buffer (CPB) (56). If the access unit is an IDR (Instantaneous Decoder Refresh) picture, it is checked whether a decoded picture buffer (DPB) (60) has a free area enough to store the access unit. If the DPB (60) has a sufficient free area, a decoder (58) stores the decoding result in the DPB (60), and selects the next access unit from the CPB (56). If the DPB (60) does not have a sufficient free area and the earliest stored picture has already been displayed, the buffer area of the displayed picture is deallocated. If the earliest stored picture has not been displayed, a warning is displayed to the user. All memory areas in the DPB (60) except for the area of a currently displayed picture are deallocated to wait for an IDR picture.

13 Claims, 15 Drawing Sheets

(56) References Cited

U.S. PATENT DOCUMENTS

| | | | |
|---|---|---|---|
| 7,555,045 B2 * | 6/2009 | Kono et al. | 375/240.25 |
| 7,630,443 B2 * | 12/2009 | Sato | 375/240.29 |
| 7,940,845 B2 * | 5/2011 | Kondo et al. | 375/240.16 |
| 2002/0009149 A1 | 1/2002 | Rodriguez et al. | |
| 2004/0136461 A1 * | 7/2004 | Kondo et al. | 375/240.16 |
| 2004/0146109 A1 * | 7/2004 | Kondo et al. | 375/240.16 |
| 2005/0031030 A1 * | 2/2005 | Kadono et al. | 375/240.01 |
| 2005/0058206 A1 * | 3/2005 | Lim et al. | 375/240.25 |
| 2005/0289616 A1 | 12/2005 | Horiuchi et al. | |
| 2007/0110158 A1 | 5/2007 | Maeda | |

* cited by examiner

F I G. 2
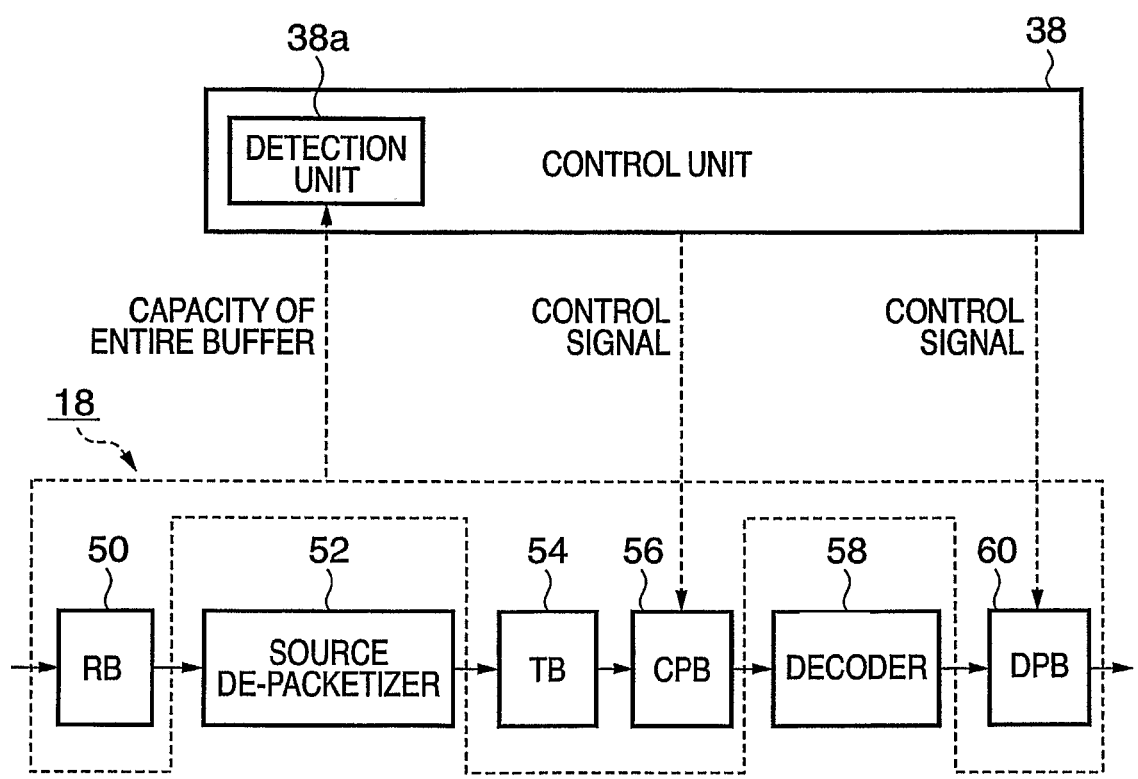

FIG. 3

| SYNTAX | NUMBER OF BITS | MNEMONIC |
|---|---|---|
| source_packet ( ) { | | |
|     TP_extra_header ( ) | 4 | |
|     transport_packet ( ) | 188 | |
| } | | |

FIG. 4

| SYNTAX | NUMBER OF BITS | MNEMONIC |
|---|---|---|
| TP_extra_header ( ) { | | |
| copy_permission_indicator | 2 | bslbf |
| arrival_time_stamp | 30 | uimsbf |
| } | | |

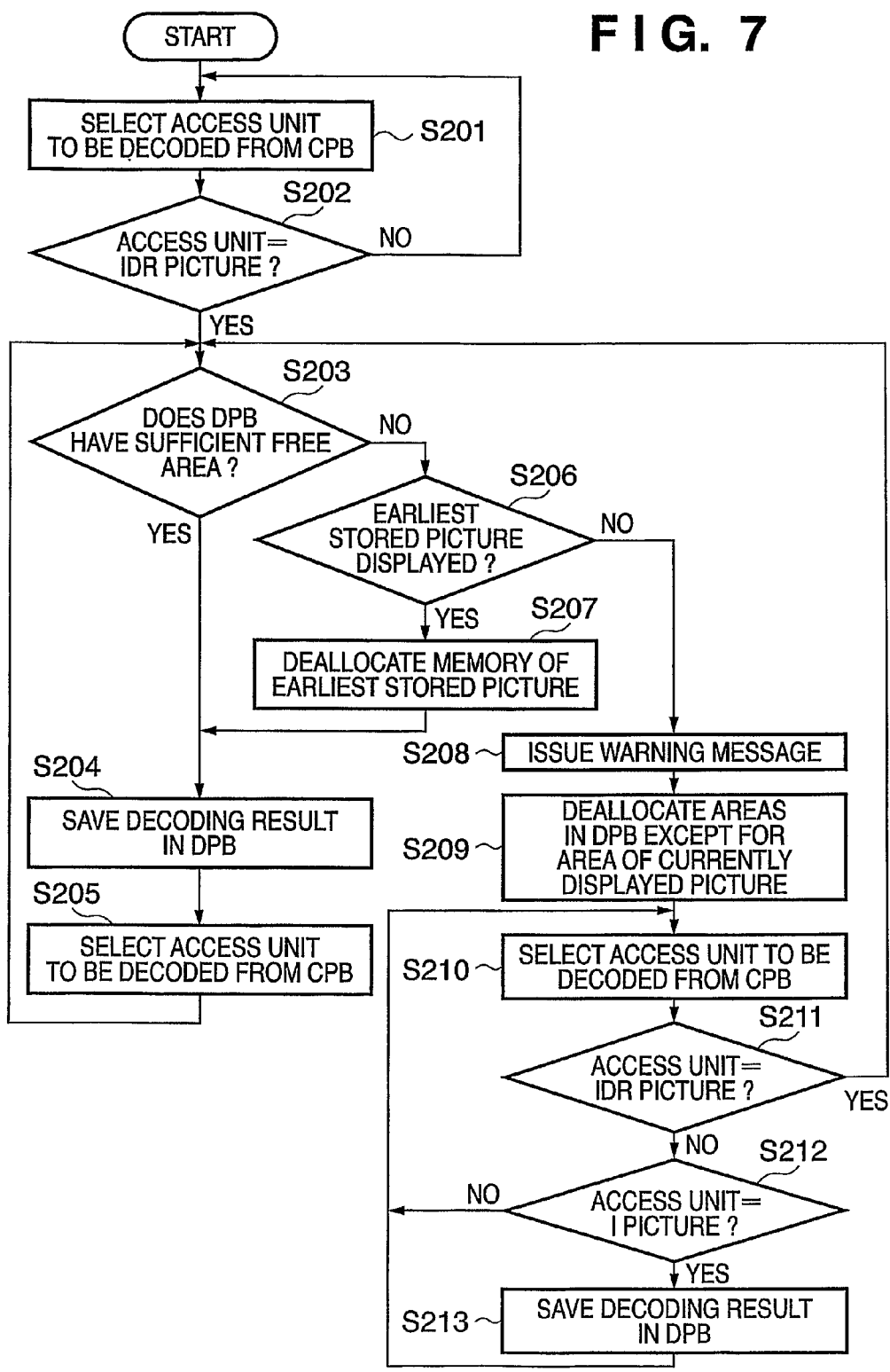
F I G. 7

F I G. 10

| User_data_unregisterd (payloadSize) { | |
|---|---|
| unid_iso_iec_11578 | 128bit |
| DPB_PIC_NUM | 16bit |
| } | |

FIG. 11

| |
|---|
| zzzzz.clpi ( ) { |
|    type_indicator |
|    version_number |
|    SequenceInfo_start_address |
|    CPI_start_address |
|    CripMark_start_address |
|    ExtensionData_start_address |
|    DpbInfo_start_address |
|    reserved_for_future_use |
|    ClipInfo ( ) |
|    for (i=0; i<N1; i++) { |
|       padding_word |
|    } |
|    SequenceInfo |
|    for (i=0; i<N2; i++) { |
|       padding_word |
|    } |
|    ProgramInfo ( ) |
|    for (i=0; i<N3; i++) { |
|       padding_word |
|    } |
|    CPI ( ) |
|    for (i=0; i<N4; i++) { |
|       padding_word |
|    } |
|    ClipMark ( ) |
|    for (i=0; i<N5; i++) { |
|       padding_word |
|    } |
|    ExtensionData |
|    for (i=0; i<N6; i++) { |
|       padding_word |
|    } |
|    DpbInfo ( ) |
|    for (i=0; i<N6; i++) { |
|       padding_word |
|    } |

FIG. 12

| DpbInfo ( ) { |
|---|
| length |
| number_of_entries |
| for (i=0; i<number_of_entries; i++) { |
|    PTS |
|    Dpb_Info |
|   } |
| } |

IMAGE DECODING APPARATUS

CROSS-REFERENCE TO RELATED APPLICATIONS

This application is a national stage application of International Application No. PCT/JP2007/065919, filed Aug. 9, 2007, whose benefit is claimed and which claims the benefit of Japanese Patent Application No. 2006-218820, filed Aug. 10, 2006, whose benefit is also claimed.

TECHNICAL FIELD

The present invention relates to an image decoding apparatus and, more particularly, to an image decoding apparatus which decodes image data compressed by inter picture predictive encoding such as H.264/MPEG-4 Part 10: AVC (to be referred to as H.264 hereinafter).

BACKGROUND ART

Video recording/playback apparatuses such as a digital video camera have been examined. The video recording/playback apparatus records still and moving images on a large-capacity optical disk used as a recording medium instead of a DVD (Digital Versatile Disc). Next-generation optical disk standards include the adoption of a moving image compression encoding technique for higher compression ratios, in addition to increasing the recording capacity of media. One of these standards is H.264.

To increase the compression ratio, H.264 permits the use of many reference picture memories in inter picture prediction, compared to conventional techniques such as MPEG2. H.264 exhibits a high degree of freedom to rearrange decoded pictures.

For example, according to MPEG2, a P picture is always used as a reference picture, and no B picture can be used as a reference picture. An MPEG2 decoder can only check the picture type (I, P, or B) to determine whether a decoded picture needs to be saved in a reference picture memory. To the contrary, according to H.264, even a P picture may not be used as a reference picture, and even a B picture may be used as a reference picture.

The H.264 standards permit the use of a specific reference picture in decoding or encoding for a long period. According to MPEG2, a FIFO (First In First Out) is used as a reference picture memory, and pictures which can be referred to are limited. According to H.264, even a temporally distant picture, which cannot be referred to in MPEG2, can be used as a reference picture.

This H.264-based flexible inter picture prediction is important in increasing the encoding efficiency. To implement this function, however, the reference picture memory must store a larger number of reference pictures in H.264 than in MPEG2. Rearranging so many reference pictures requires a larger memory capacity and more calculation.

To solve this problem, there is proposed an arrangement which decreases the number of images to be stored in a reference picture memory by controlling the reference relationship (see Japanese Patent Laid-Open No. 2005-260588).

A picture referred to for a long period, i.e., a so-called long-term reference picture in H.264 is advantageous to compression-encoding a substantially motionless scene when taking a picture of a landscape or the like. However, the long-term reference picture is not suited to a digital video camera which encodes an actively moving object in real time when taking a picture of an athletic meeting or the like. Even the method disclosed in Japanese Patent Laid-Open No. 2005-260588 is considered to be unsuitable to compression-encode a picture of an actively moving object in an athletic meeting or the like. When a digital video camera uses a B picture as a reference picture, the reference relationship becomes complicated, and arithmetic processing becomes heavy, increasing battery consumption.

Hence, it is effective to impose some restrictions in encoding on the use of functions permitted by the profile of the H.264 standards. For example, an H.264 CODEC used in a consumer digital video camera or the like to perform real-time encoding does not use a long-term reference picture, or does not use a B picture as a reference picture. This can reduce the memory capacity, operation load, and hardware cost, and prolong the service life of the battery.

In decoding by a small-size CODEC, a stream recorded by its own device can be played back without any error. When, however, an H.264 bit stream generated by another device with a complicated reference relationship is input, decoding may fail owing to a shortage of the reference picture storage buffer, or the like.

DISCLOSURE OF INVENTION

The present invention has been made to overcome the conventional drawbacks, and has as its object to provide an image decoding apparatus capable of decoding without any error even upon receiving an encoded bit stream with a complicated reference relationship.

To achieve the above object, according to the first aspect of the present invention, an image decoding apparatus which decodes image data compressed using inter picture predictive encoding comprises a first picture buffer which stores the compressed image data, a second picture buffer which stores decoded image data, decoding means for decoding the compressed image data stored in the first picture buffer by referring to image data stored in the second picture buffer, as needed, and for storing the decoded image data in the second picture buffer, detection means for detecting a free area of the second picture buffer, and control means for interrupting decoding by the decoding means in accordance with a detection result of the detection means when the free area is smaller than a predetermined value.

According to the second aspect of the present invention, an image decoding apparatus which decodes image data compressed using inter picture predictive encoding and intra picture encoding comprises a first picture buffer which stores the compressed image data, a second picture buffer which stores decoded image data, decoding means for decoding the compressed image data stored in the first picture buffer by referring to image data stored in the second picture buffer, as needed, and for storing the decoded image data in the second picture buffer, the decoding means being able to selectively execute a full decoding process mode in which both image data compressed by inter picture predictive encoding and image data compressed by intra picture encoding are decoded, and a selective decoding process mode in which only image data compressed by intra picture encoding is decoded, detection means for detecting a free area of the second picture buffer, and control means for instructing the decoding means to perform decoding in the selective decoding process mode in accordance with a detection result of the detection means when the free area is smaller than a predetermined value.

According to the third aspect of the present invention, a method of controlling an image decoding apparatus which decodes image data compressed using inter picture predictive encoding, the image decoding apparatus having a first picture buffer which stores the compressed image data, and a second picture buffer which stores decoded image data, comprises a decoding step of decoding the compressed image data stored in the first picture buffer by referring to image data stored in the second picture buffer, as needed, and of storing the decoded image data in the second picture buffer, a detection step of detecting a free area of the second picture buffer, and a control step of interrupting decoding in the decoding step in accordance with a detection result in the detection step when the free area is smaller than a predetermined value.

According to the fourth aspect of the present invention, a method of controlling an image decoding apparatus which decodes image data compressed using inter picture predictive encoding and intra picture encoding, the image decoding apparatus having a first picture buffer which stores the compressed image data, and a second picture buffer which stores decoded image data, comprises a decoding step of decoding the compressed image data stored in the first picture buffer by referring to image data stored in the second picture buffer, as needed, and of storing the decoded image data in the second picture buffer, the decoding step being able to selectively execute a full decoding process mode in which both image data compressed by inter picture predictive encoding and image data compressed by intra picture encoding are decoded, and a selective decoding process mode in which only image data compressed by intra picture encoding is decoded, a detection step of detecting a free area of the second picture buffer, and a control step of designating decoding in the selective decoding process mode in the decoding step in accordance with a detection result in the detection step when the free area is smaller than a predetermined value.

Further features of the present invention will become apparent from the following description of exemplary embodiments with reference to the attached drawings.

BRIEF DESCRIPTION OF DRAWINGS

FIG. 2 is a block diagram showing a schematic buffer arrangement in decoding according to the first embodiment;

FIG. 3 is a table of the structure of a source packet according to the first embodiment;

FIG. 4 is a table of the structure of a header according to the first embodiment;

FIG. 7 is a flowchart showing a decoding operation according to the second embodiment;

FIG. 10 shows a structure of user data which holds the necessary buffer capacity of the DPB;

FIG. 11 shows a structure of a management file;

FIG. 12 shows a structure of DPB information;

BEST MODE FOR CARRYING OUT THE INVENTION

Preferred embodiments of the present invention will be described in detail below with reference to the accompanying drawings.

First Embodiment

Figure 1:
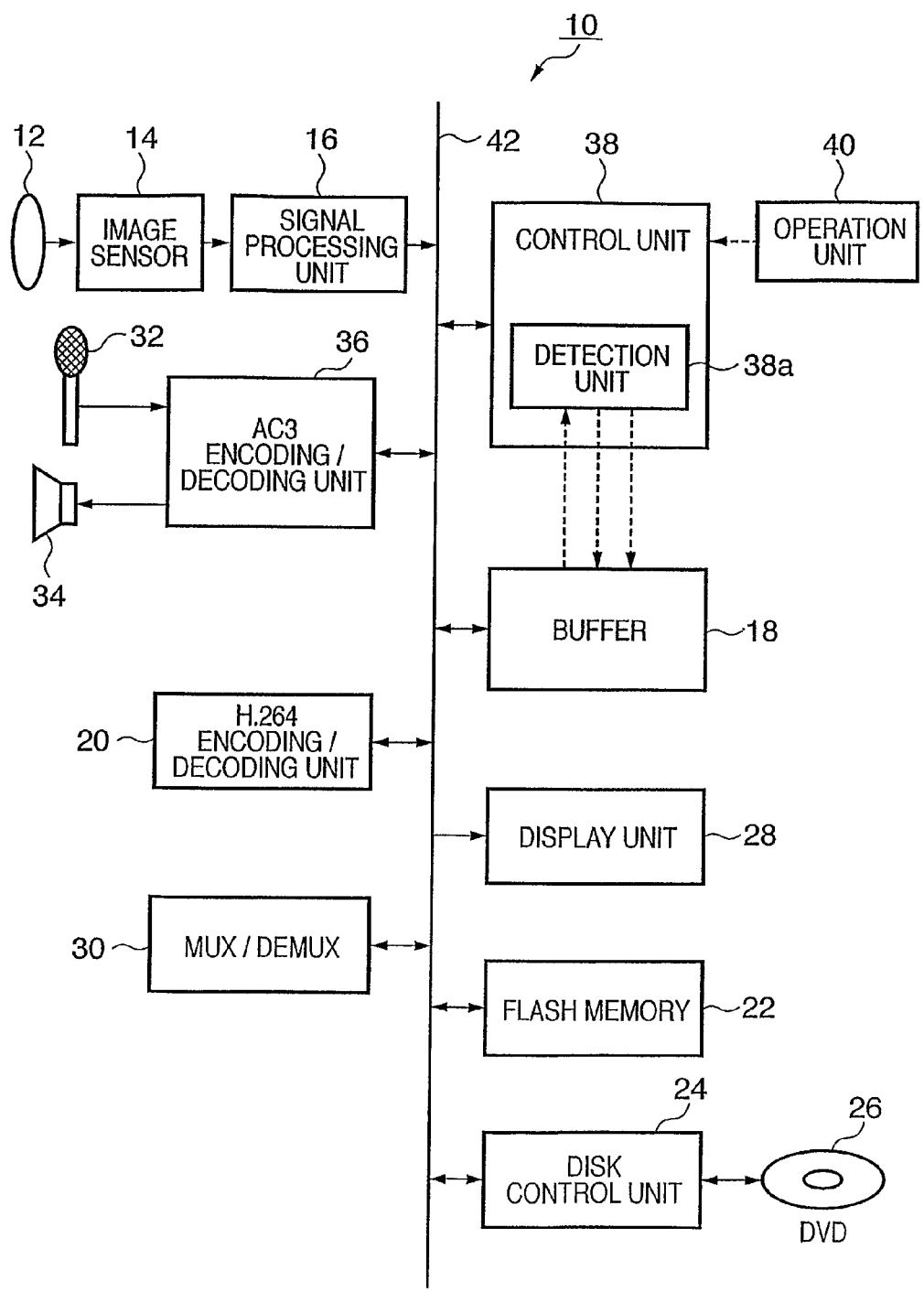
FIG. 1 is a block diagram of a schematic arrangement according to the first embodiment of the present invention.

FIG. 1 is a block diagram of the schematic arrangement of an image capturing apparatus according to the first embodiment of the present invention. FIG. 2 is a block diagram of the schematic arrangement of a buffer according to the first embodiment. An image capturing apparatus 10 is, e.g., an H.264 (AVC)-based digital camera or digital video camera. In FIG. 1, solid lines represent the flows of image data or audio data, and broken lines represent control signals.

The image capturing apparatus 10 comprises a photographing lens 12, an image sensor 14, a signal processing unit 16, a buffer 18, a video encoding/decoding unit 20 which encodes/decodes video data in accordance with H.264, a flash memory 22, a disk control unit 24 which writes/reads out data in/from a recording medium 26 such as a DVD disk (to be referred to as a DVD hereinafter), a display unit 28, a multiplexer (MUX)/demultiplexer (DEMUX) 30, a microphone 32, a loudspeaker 34, an audio encoding/decoding unit 36 which encodes/decodes audio data in accordance with AC3, a control unit 38, an operation unit 40, and a bus 42.

The photographing lens 12 is an optical element which forms an optical image of an object onto the imaging plane of the image sensor 14. The photographing lens 12 has a stop mechanism and shutter mechanism. The image capturing apparatus 10 comprises an auto focus mechanism which automatically adjusts the focus of the photographing lens to an object.

The image sensor 14 is an optical element which converts an optical image from the photographing lens 12 into an electrical signal. The image sensor 14 is formed from, e.g., a CCD (Charge Coupled Device) image sensor, or a CMOS (Complementary Metal Oxide Semiconductor) image sensor. The signal processing unit 16 converts an analog image signal from the image sensor 14 into a digital signal, performs signal processes (e.g., gamma correction, color balance adjustment, and luminance/color separation) well known in a camera, and outputs video data of a predetermined video format.

The buffer 18 temporarily stores data input/output between devices connected to the bus 42.

Concrete functions of the buffer 18 will be described later.

The video encoding/decoding unit 20 generates compressed video data by compression-encoding a digital video signal by a video compression scheme such as H.264/MPEG (Moving Picture Experts Group)-4 Part 10: AVC (Advanced Video Coding). The video encoding/decoding unit 20 decompresses compressed video data from the disk control unit 24.

The flash memory 22 is a non-volatile recording medium, and stores programs associated with the operation of the image capturing apparatus 10.

The disk control unit 24 writes compressed video data, compressed audio data, file management information, and the like in the recording medium 26 in accordance with an instruction from the control unit 38. Also, the disk control unit 24 reads out compressed video data, compressed audio data, file management data, and the like from the recording medium 26. The recording medium 26 is, e.g., a writable optical disk such as a DVD-R, a magnet disk, or a semiconductor memory (memory card).

The display unit 28 is formed from an electronic viewfinder, LCD (Liquid Crystal Display), or the like. The display unit 28 displays an image of video data from the signal processing unit 16 in the image capturing mode, and displays an image of compressed video data reproduced from the recording medium 26 by the disk control unit 24 in the playback mode.

The multiplexer/demultiplexer 30 multiplexes video data compressed by the video encoding/decoding unit 20 and audio data compressed by the audio encoding/decoding unit 36, and demultiplexes multiplexed compressed video and audio data. The multiplexer/demultiplexer 30 adds a 4-byte header to the source packet of compressed video data or compressed audio data. Compressed video data and compressed audio data are managed using the header information.

The microphone 32 has an AGC (Automatic Gain Control) and A/D converter. The microphone 32 receives and amplifies sound outside the image capturing apparatus 10 to generate a digital audio signal. The loudspeaker 34 has an amplifier, and outputs a digital audio signal as sound to outside the image capturing apparatus 10.

The audio encoding/decoding unit 36 generates compressed audio data by compression-encoding a digital audio signal from the microphone 32 by an AC (Audio Code number) 3 audio compression scheme. The audio encoding/decoding unit 36 decompresses compressed audio data from the disk control unit 24, and supplies the audio data to the loudspeaker 34.

The control unit 38 comprises a CPU (Central Processing Unit) or MPU (Micro Processing Unit), and controls the overall image capturing apparatus 10. A detection unit 38a detects the entire capacity of the buffer 18. The detection unit 38a supplies an enable signal to a CPB (Coded Picture Buffer) or DPB (Decoded Picture Buffer) (to be described later). The bus 42 is used to transfer various data between the above-described units.

The operation unit 40 has a moving image recording switch, release switch, playback switch, and stop switch. The user uses the operation unit 40 to instruct the control unit 38 to capture a moving image, capture a still image, or play back image data or audio data. The operation unit 40 also has a mode dial, menu key, selection key, enter key, and the like. With these keys, the user can instruct the control unit 38 to switch the operation mode between the image capturing mode and the playback mode, display a setup window, and make various selections and various decisions on the screen.

The control unit 38 in the image capturing apparatus 10 controls each unit in accordance with an operation mode designated by the user. In the image capturing mode, the display unit 28 displays an image captured by the image sensor 14. In the recording mode in which a captured image or the like is recorded, video data and audio data are compression-encoded on the basis of the aspect ratio of an image, compression encoding format, resolution, the number of audio channels, and the like. The compressed video data and compressed audio data are multiplexed in a predetermined format, and recorded on the recording medium 26 in a predetermined digital moving image format. In the playback mode, compressed video data and compressed audio data, which are multiplexed, are read out from the recording medium 26, and sequentially decoded and played back on the basis of playback management information (index.bdmv, MovieObject, PlayList, and the like) and a user instruction.

A characteristic operation of the first embodiment concerning decoding of compressed data and management of the buffer 18 will be explained with reference to FIGS. 2 to 4. FIG. 2 is a schematic view showing the process procedures of the buffer 18 and video encoding/decoding unit 20 in playback. FIG. 3 shows the packet format of video data compressed by the video encoding/decoding unit 20 and that of audio data compressed by the audio encoding/decoding unit 36. A source packet source_packet( ) is made up of a 4-byte header TP_extra_header( ) and a 188-byte transport packet Transport_packet( ). As shown in FIG. 4, the header TP_extra_header( ) is made up of a 2-bit copy permission indicator copy_permission_indicator and a 30-bit arrival time stamp arrival_time_stamp. The copy permission indicator copy_permission indicator holds information on the protection of contents. The arrival time stamp arrival_time_stamp holds, at a precision of 27 MHz, the time when the transport packet Transport_packet( ) arrives at a transport buffer 54. Details of the transport packet Transport_packet( ) are described in ISO/IEC13818-1, and a description thereof will not be repeated.

Upon receiving a playback instruction from the user, the image capturing apparatus 10 reads out compressed video data and compressed audio data from the recording medium 26, and stores them in a read buffer (RB) 50. A source de-packetizer 52 deletes the header TP_extra_header( ) from a source packet arriving at the arrival time stamp arrival_time_stamp among source packets stored in the read buffer 50. Then, the source de-packetizer 52 writes the header-deleted source packet in the transport buffer (TB) 54. Data stored in the transport buffer 54 is de-packetized into an elementary stream in accordance with a predetermined rate or H.264/AVC virtual decoder model, and stored in a coded picture buffer (CPB) 56.

A decoder 58 in the video encoding/decoding unit 20 decodes each access unit of an elementary stream stored in the CPB 56 on the basis of the buffering period SEI and picture timing SEI, and stores the decoded video data in a decoded picture buffer (DPB) 60. The buffering period SEI and picture timing SEI are additional information contained in an elementary stream. The buffering period SEI represents the delay time until an access unit is decoded. The picture timing SEI represents the decoding time and display time of each access unit. Details of the buffering period SEI and picture timing SEI are described in ITU-T Rec. H.264 and the like, and a further description thereof will not be repeated.

Decoded video data stored in the DPB 60 is used for display, and also used as a reference picture in decoding a picture encoded using inter picture prediction.

Reference pictures stored in the DPB 60 are managed in two ways. According to the moving frame memory management method, when a memory enough to store pictures cannot be allocated in the DPB for a reference picture to be newly stored, the buffer area of the earliest stored picture among reference pictures is deallocated. According to the adaptive memory management method, a reference picture and its operation are controlled concretely. Reference pictures are classified into long-term reference pictures referred to for a long period during streaming, and short-term reference pictures referred to for only a short period. The moving frame memory management method and adaptive memory management method are switched and used in accordance with generation of such reference pictures.

Figure 5:
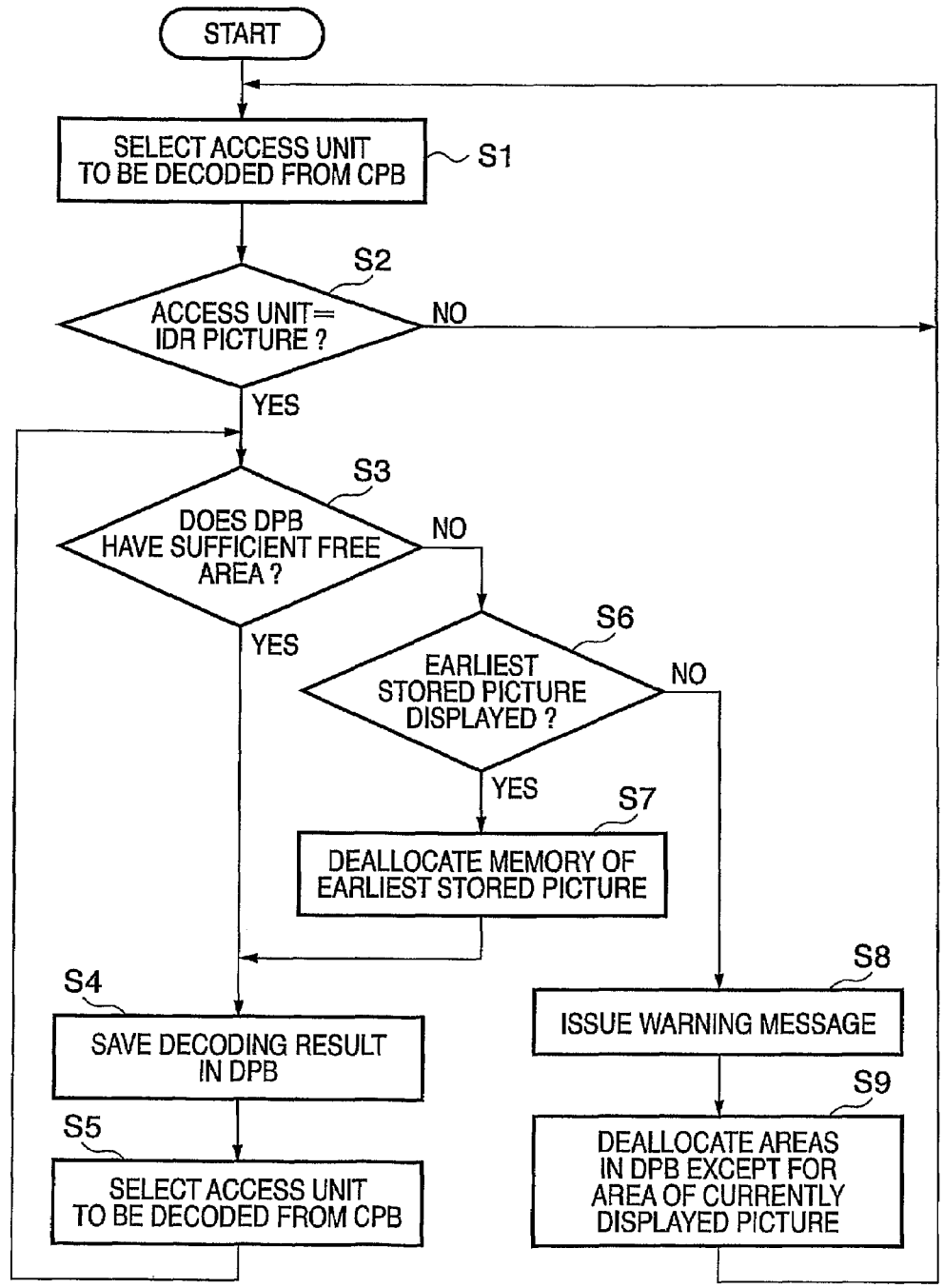
FIG. 5 is a flowchart showing a decoding operation according to the first embodiment.

FIG. 5 is a flowchart of an operation when compressed video/audio data is played back and the capacity of the DPB 60 runs short. For example, a recording medium 26 on which another recording device records video data and audio data is loaded, and video data and audio data are played back from the recording medium 26.

The decoder 58 selects an access unit to be decoded from data stored in the coded picture buffer (CPB) 56 (S1), and determines whether the access unit is an IDR (Instantaneous Decoder Refresh) picture (S2). If the access unit is not an IDR picture (NO in S2), the decoder 58 cannot start the decoding process, so discards the access unit, and returns to step S1.

If the access unit is an IDR picture (YES in S2), the decoder 58 checks whether the decoded picture buffer (DPB) 60 has a free area to store the access unit (S3). If the DPB 60 has a free area to store the access unit (YES in S3), the decoder 58 stores the decoding result in the DPB 60 (S4), selects the next access unit to be decoded from the CPB 56 (S5), and returns to step S3.

If the DPB 60 does not have a free area (NO in S3), the decoder 58 checks whether the display unit 28 has already displayed the earliest stored picture (S6). If the display unit 28 has already displayed the earliest stored picture (YES in S6), the decoder 58 deallocates the buffer area of the displayed picture (S7), and advances to step S4. If the display unit 28 has not displayed the earliest stored picture (NO in S6), the display unit 28 displays a warning message to the user (S8). The decoder 58 deallocates all memory areas in the DPB 60 except for the area of a currently displayed picture (S9), and returns to step S1 to wait for an IDR picture. In the IDR picture standby state, pictures except for a currently displayed one are deleted, and the image of only one picture left in the DPB 60 is repetitively displayed.

According to the first embodiment, when a buffer area enough to store a reference picture cannot be allocated in the decoded picture buffer (DPB) 60, the process waits for the next IDR picture while repetitively displaying the current image, thereby avoiding a fatal error in the decoding process.

A warning message is issued in step S8, but if not necessary, may be omitted. In step S9, the buffer areas of pictures except for a currently displayed picture are deallocated. However, the process is not limited to this as long as a memory area necessary for the next decoding process can be finally allocated in the decoded picture buffer (DPB) 60. For example, undisplayed pictures in the DPB 60 may be sequentially displayed to deallocate their buffer areas. Alternatively, the display unit 28 may display a blue screen or the like instead of a playback image to deallocate all memory areas in the DPB 60 at once.

Figure 6:
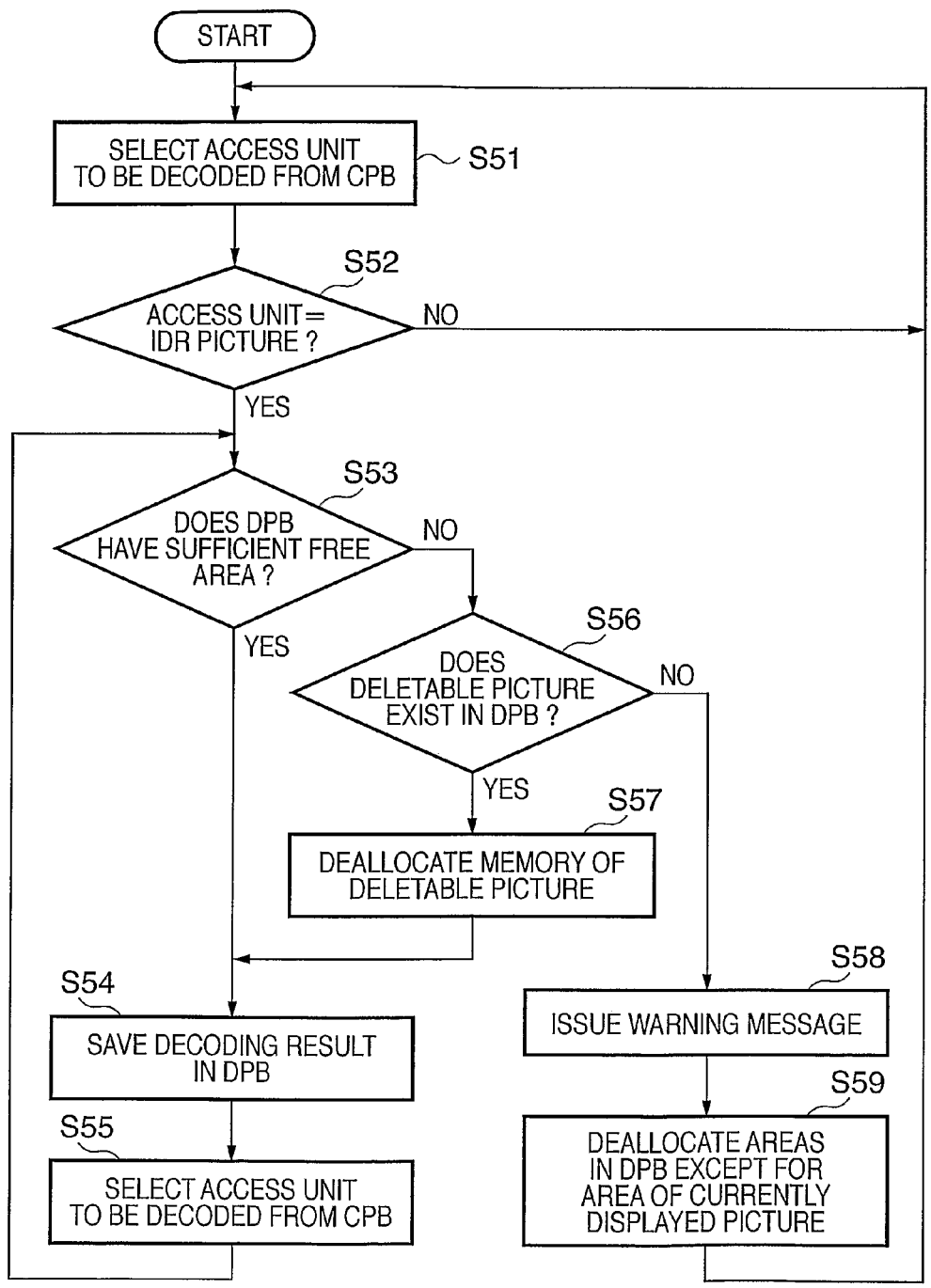
FIG. 6 is a flowchart showing a decoding operation by another buffer management method according to the first embodiment.

FIG. 6 is a flowchart of an operation according to the adaptive memory management method. Steps S51 to S59 correspond to steps S1 to S9 in FIG. 5. Steps S56 and S57 are different from the flowchart of FIG. 5. In FIG. 6, if the decoded picture buffer (DPB) 60 does not have a sufficient free area (NO in S53), the decoder 58 checks whether a deletable picture exists in the DPB 60 (S56). If a deletable picture exists (YES in S56), the decoder 58 deletes the picture from the DPB 60 to deallocate its buffer area (S57), and advances to step S54. If no deletable picture exists (NO in S56), the display unit 28 displays a warning message to the user (S58). The decoder 58 deallocates all memory areas in the DPB 60 except for the area of a currently displayed picture (S59), and returns to step S51 to wait for an IDR picture.

Also according to the operation shown in FIG. 6, when a buffer area enough to store a reference picture cannot be allocated in the decoded picture buffer (DPB) 60, the process waits for the next IDR picture while repetitively displaying the current image, thereby avoiding a fatal error in the decoding process.

A warning message is issued in step S58, but if not necessary, may be omitted. In S59, the buffer areas of pictures except for a currently displayed picture are deallocated. However, the process is not limited to this as long as a memory area necessary for the next decoding process can be finally allocated in the decoded picture buffer (DPB) 60. For example, undisplayed pictures in the DPB 60 may be sequentially displayed to deallocate their buffer areas. Alternatively, the display unit 28 may display a blue screen or the like instead of a playback image to deallocate all memory areas in the DPB 60 at once.

Second Embodiment

The operation of the second embodiment of the present invention will be described. In the first embodiment, a picture in the decoded picture buffer (DPB) is repetitively displayed until the decoding process restarts in response to an IDR picture. In the second embodiment, a display image is properly updated by an I picture before decoding restarts in response to an IDR picture, as shown in FIG. 7. The second embodiment is different from the first embodiment in only the operations of a control unit 38 and decoder 58. The operations of the remaining building elements are the same as those in the first embodiment. The decoder 58 according to the second embodiment can execute a mode (full decoding process mode) in which I, P, and B pictures are sequentially decoded, which is a normal operation, and a mode (selective decoding process mode) in which only intra picture encoded image data (I pictures) are selectively decoded.

Steps S201 to S209 in FIG. 7 are the same as steps S to S9 in FIG. 5. Step S210 and subsequent steps in FIG. 7 are added to the flowchart of FIG. 5. After deallocating all memory areas in a decoded picture buffer (DPB) 60 except for the area of a currently displayed picture (S209), the decoder 58 selects an access unit to be decoded from a coded picture buffer (CPB) 56 (S210), similar to step S201. The decoder 58 determines whether the access unit is an IDR picture (S211). If the selected access unit is an IDR picture (YES in S211), the decoder 58 returns to step S203 to similarly decode the IDR picture and subsequent pictures.

If the selected access unit is not an IDR picture (NO in S211), the decoder 58 determines whether the access unit is an I picture (S212). If the access unit is an I picture (YES in S212), the decoder 58 decodes the I picture, and stores the decoding result in the DPB 60 (S213). A display unit 28 displays the decoded I picture at a predetermined timing, e.g., a timing defined by the picture timing SEI, and the display image is sequentially switched. If the access unit is not an I picture (NO in S212), the decoder 58 returns to step S210 to select the next access unit to be decoded (S210).

That is, in steps S210 to S213, the control unit 38 instructs the decoder 58 to execute the selective decoding process mode in which only I pictures are decoded until the next IDR picture is detected. If an IDR picture is detected, the decoder 58 switches its operation from the selective decoding process mode to the normal full decoding process mode.

As described above, when a buffer area enough to store a reference picture cannot be allocated in the decoded picture buffer (DPB) 60, the process waits for the next IDR picture while repetitively displaying the current image, thereby avoiding a fatal error in the decoding process. Since an I picture is decoded to update the display screen until the decoding process restarts, unnaturalness of the playback frame can be reduced.

Figure 8:
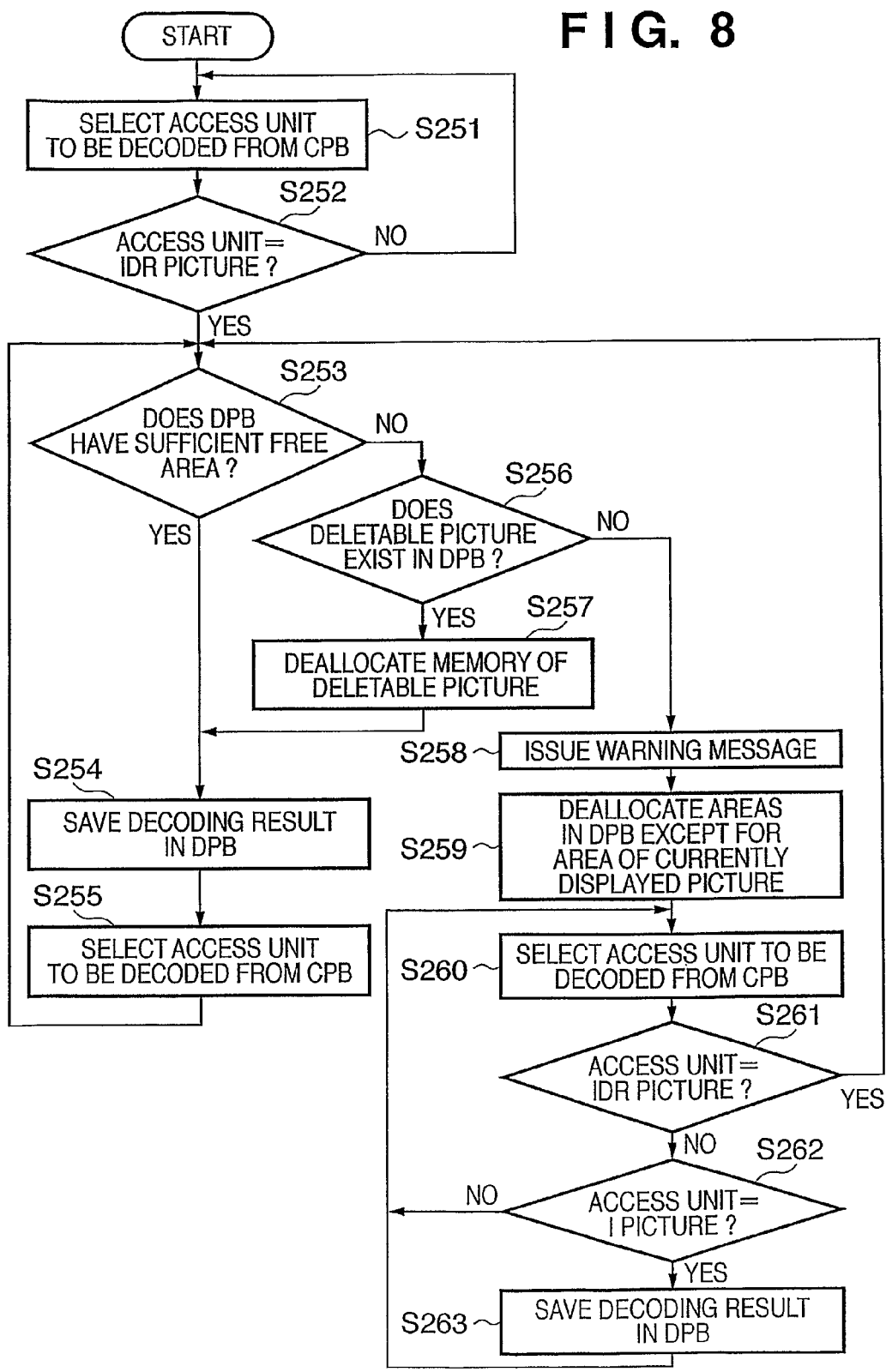
FIG. 8 is a flowchart showing a decoding operation by another buffer management method according to the second embodiment.

FIG. 8 is a flowchart of an operation according to the adaptive memory management method. Steps S251 to S263 correspond to steps S201 to S213 in FIG. 7. Steps S256 and S257 are different from the flowchart of FIG. 7. In FIG. 8, if the decoded picture buffer (DPB) 60 does not have a sufficient free area (NO in S253), the decoder 58 checks whether a deletable picture exists in the DPB 60 (S256). If a deletable picture exists (YES in S256), the decoder 58 deletes the picture from the DPB 60 to deallocate its buffer area (S257), and advances to step S254. If no deletable picture exists (NO in S256), the same process (steps S258 to S263) as that in FIG. 7 is executed.

Third Embodiment

A decoding error can be prevented by recording information on the capacity of a decoded picture buffer (DPB) 60 necessary for the decoding process on a recording medium 26 together with compressed data in the encoding process, and referring to this information in decoding.

Figure 9:
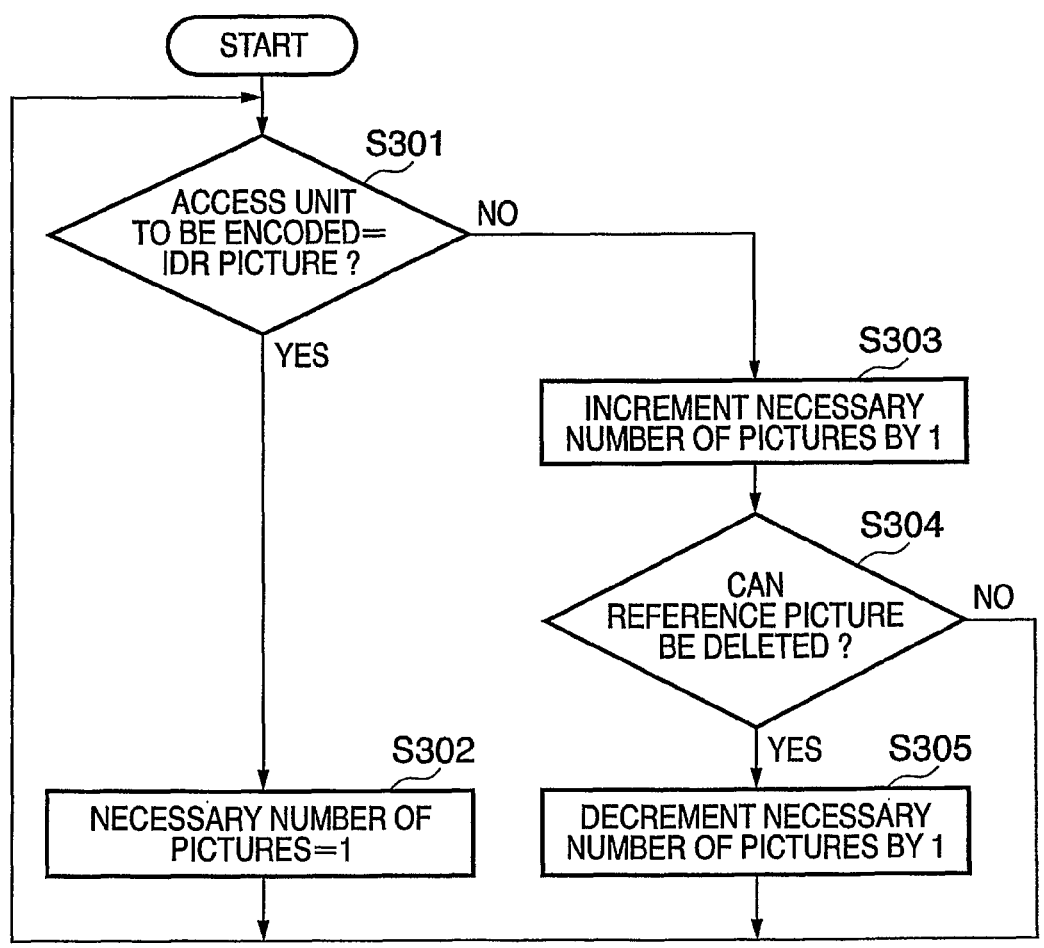
FIG. 9 is a flowchart to acquire the necessary buffer capacity of a DPB.

FIG. 9 is a flowchart to acquire the number of pictures which must be held in the decoded picture buffer (DPB) 60 when decoding each picture. It is determined whether the access unit to be encoded is an IDR picture (S301). If the access unit to be encoded is an IDR picture (YES in S301), the number of pictures necessary in the DPB 60 is initialized to 1 (S302).

If the access unit to be encoded is not an IDR picture (NO in S301), the necessary number of pictures is incremented by only 1 (S303). It is determined whether the current encoding permits deleting an arbitrary picture held in the DPB 60 after decoding the picture (S304). If the current encoding permits deleting an arbitrary picture held in the DPB 60 after decoding the picture (YES in S304), the necessary number of pictures is decremented by only 1 (S305), and the process returns to step S301. If the current encoding inhibits deleting an arbitrary picture held in the DPB 60 after decoding the picture (NO in S304), the process returns to step S301.

By repeating this process, the necessary number of pictures stored in the decoded picture buffer (DPB) 60 when decoding each picture can be calculated. The calculated necessary number of pictures may be stored as follows in stream data. FIG. 10 shows a structure for storing the necessary number of pictures in stream data. FIG. 11 shows a structure of a management file zzzzz.clpi recorded in one-to-one correspondence with a stream file. FIG. 12 is a schematic view for explaining details of DPB information DpbInfo( ).

In FIG. 10, a message SEI_massage( ) added to an H.264-encoded access unit contains user data User_data_unregistered in which a variable DPB_PIC_NUM holds the number of pictures necessary in the DPB 60 in decoding. The message SEI_massage( ) and user data User_data_unregistered are defined in ITU-T Rec. H.264, and a detailed description thereof will not be repeated.

This information may be added to each access unit, only an access unit serving as an IDR picture, or the like. When the information is added to only an access unit serving as an IDR picture, the user data User_data_unregistered of the IDR picture holds the maximum number of pictures necessary in the DPB 60 that are generated from the IDR picture to the next IDR picture.

In FIG. 11, a DPB information start address Dpbinfo start_address represents an offset value obtained by counting the start address of DPB information DpbInfo( ) from the start of the management file zzzzz.clpi in byte order. The DPB information DpbInfo( ) is the entity of an area where the capacity of the DPB 60 necessary for decoding is stored. Details of the remaining areas are described in Blu-ray Disc Read-Only Format (Blu-ray is a trademark).

In FIG. 12, an information length Length records a value obtained by counting the entire size of the DPB information DpbInfo( ) in byte order. The number of entries number_of_entries holds the numbers of Dpb_Info and PTS. Dpb_Info holds the number of pictures which is calculated by the process of FIG. 9 and stored in the DPB 60 in decoding each picture. PTS holds, at a precision of 90 kHz, the display timing of an access unit whose Dpb_Info is valid.

In this fashion, the number of pictures which must be stored in the decoded picture buffer (DPB) 60 in decoding can be calculated in advance in encoding, and recorded in stream data or the management file.

In the third embodiment, information on the number of pictures may be stored for each access unit in a stream file managed by the management file, or for each IDR picture. Alternatively, one information may be stored for an entire stream file managed by the management file. The information may be stored in another unit.

When the information is stored for each IDR picture, the maximum number of pictures stored in the decoded picture buffer (DPB) 60 at an interval between an IDR picture and the next IDR picture is stored, and PTS holds the IDR picture display time. When one information is stored for an entire stream file managed by the management file, the maximum number of pictures which must be stored in the DPB 60 in encoding a stream file managed by the management file is stored, and PTS holds the stream data display start time.

The capacity of the DPB 60 is represented by the number of pictures, but may be recorded by the size such as bytes. When recording the capacity by bytes, the capacity is calculated not by the number of pictures but by the picture data amount in steps S302, S303, and S305 of FIG. 9.

Fourth Embodiment

Figure 13:
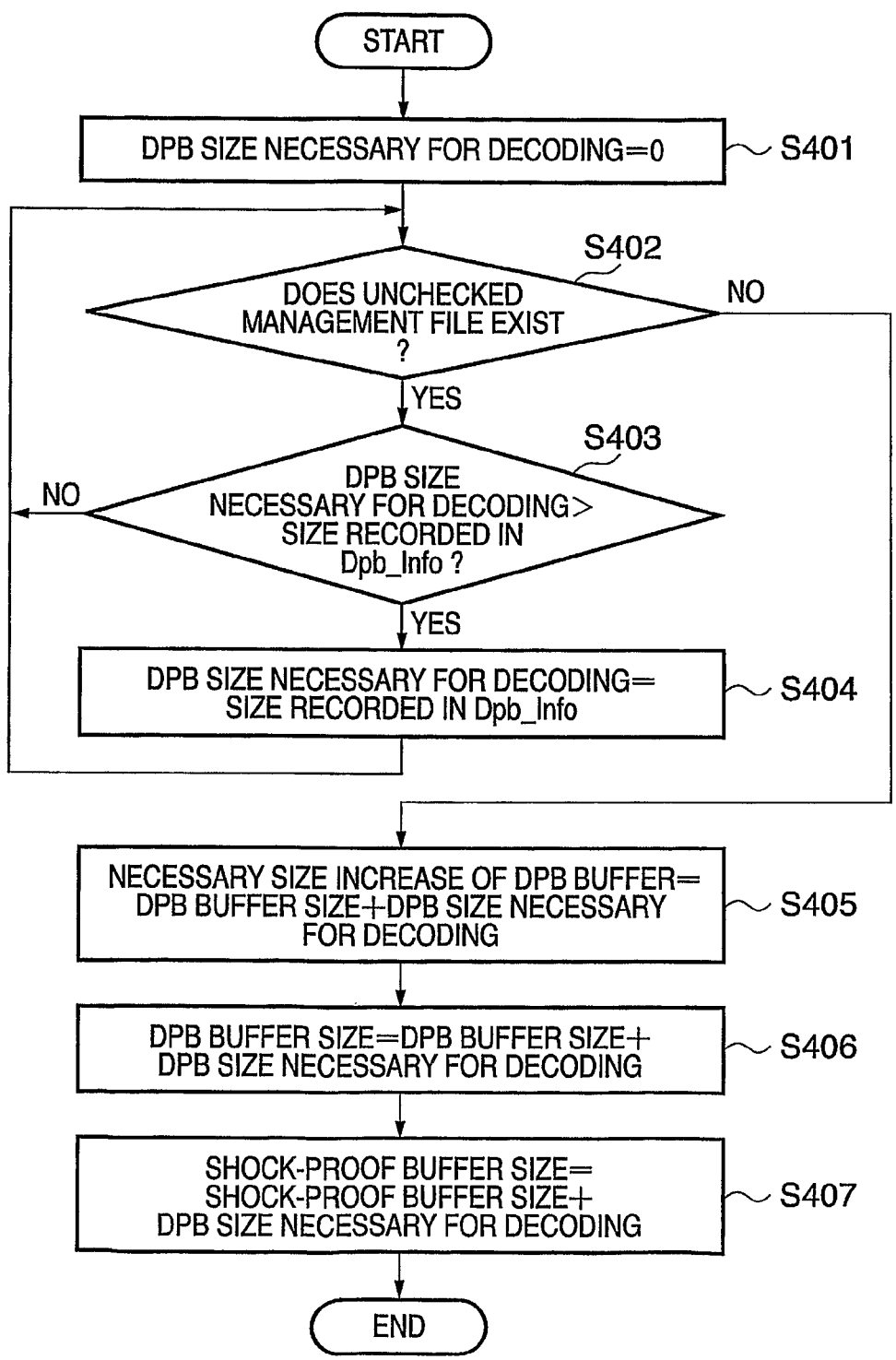
FIG. 13 is a flowchart to determine the buffer sizes of the DPB and shock-proof buffer.

The fourth embodiment will describe a method of determining the capacity of a shock-proof buffer (read buffer 50) when playing back compressed video data recorded together with information on the number of reference pictures necessary for decoding. Assume that the management file records the capacity of a decoded picture buffer (DPB) 60 necessary for decoding, the number of entries number_of_entries in the DPB information DpbInfo( ) is 1, and Dpb_Info records the maximum number of pictures which must be stored in the DPB 60 out of a stream file managed by the management file. FIG. 13 is a flowchart to determine the size of the decoded picture buffer (DPB) 60 and that of the shock-proof buffer (read buffer 50) in the decoding process.

The buffer size necessary for decoding is initialized to 0 (S401). The size of the DPB 60 necessary to play back all stream data is acquired (S402 to S404). A necessary size increase from the system default value (initial value) of the DPB buffer is calculated (S405). The necessary increase is added to the buffer size of the DPB 60 (S406). The DPB buffer increase calculated in step S405 is subtracted from the buffer size of the shock-proof buffer (read buffer 50) (S407).

This buffer size control can provide an optimal memory map which satisfy both durability against disturbance such as vibrations, and playback of streams.

In the fourth embodiment, the management file records the capacity of the decoded picture buffer (DPB) 60 necessary for decoding, the number of entries number_of_entries in the DPB information DpbInfo( ) is 1, and Dpb_Info records the maximum number of pictures which must be stored in the DPB 60 out of a stream file managed by the management file. However, the present invention is not limited to this.

Fifth Embodiment

The fifth embodiment will explain another method of determining the capacity of a shock-proof buffer (read buffer 50). Assume that the management file records the capacity of a decoded picture buffer (DPB) 60 necessary for decoding, the number of entries number_of_entries in the DPB information DpbInfo( ) represents the number of IDR pictures contained in a stream file managed by the management file, and each Dpb_Info records the maximum number of pictures which must be stored in the DPB 60 at an interval between an IDR picture and the next IDR picture.

Figure 14:
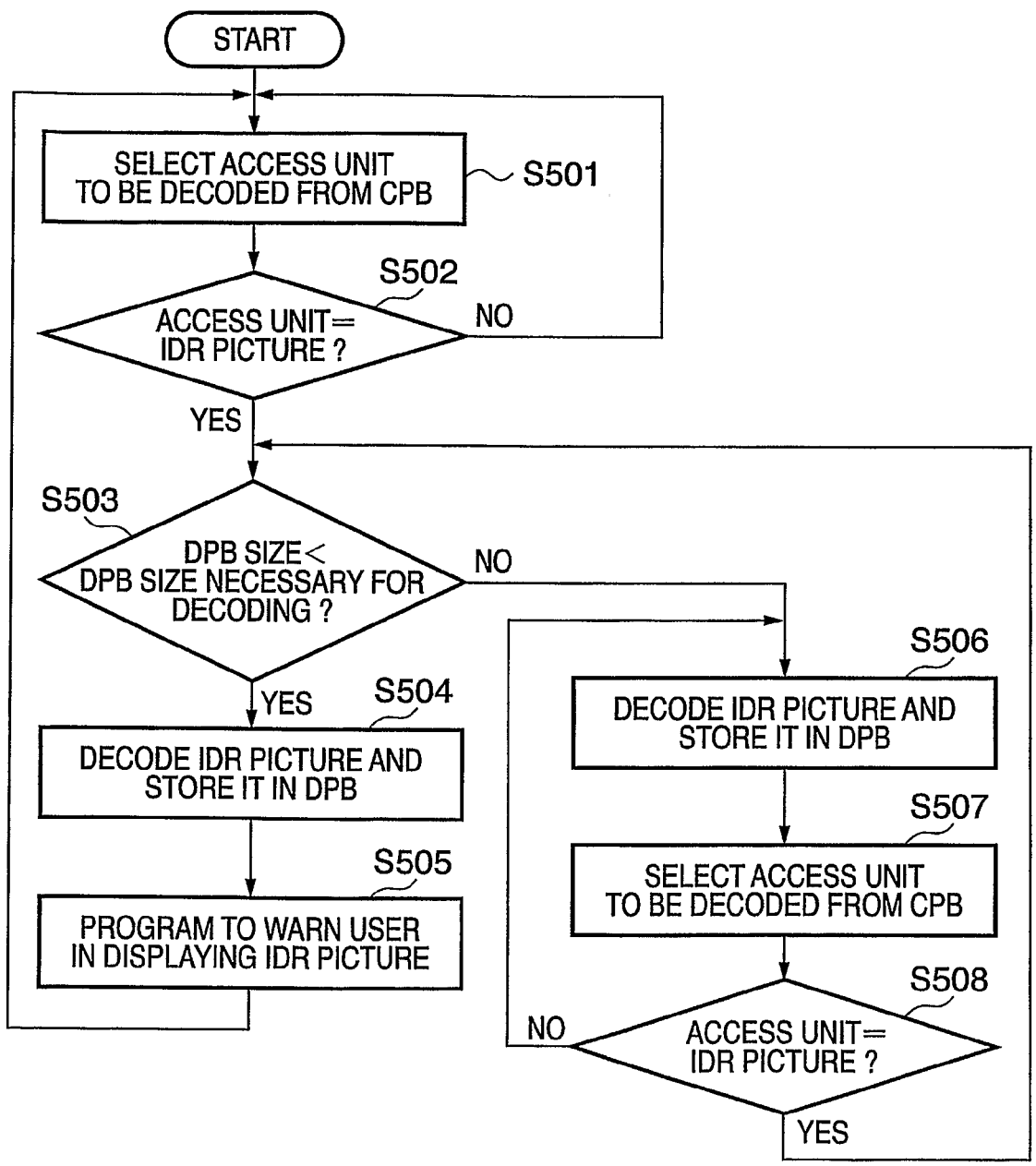
FIG. 14 is a flowchart showing a decoding operation according to the fifth embodiment.

FIG. 14 is a flowchart of an operation in decoding. In FIG. 14, an access unit to be decoded is selected from a coded picture buffer (CPB) 56 (S501). It is determined whether the selected access unit is an IDR picture (S502). If the selected access unit is not an IDR picture (NO in S502), the process returns to step S501. If the selected access unit is an IDR picture (YES in S502), the size of the decoded picture buffer (DPB) 60 necessary to decode pictures between the IDR picture and the next IDR picture is acquired from management information in accordance with PTS. It is determined whether the buffer size of the DPB 60 is equal to or larger than a necessary size (S503). If the buffer capacity of the DPB 60 is smaller (YES in S503), the IDR picture is decoded and stored in the DPB 60 (S504). It is programmed in the system to generate a warning to the user at the IDR picture display timing (S505). Then, the process returns to step S501.

If the buffer capacity of the DPB 60 is equal to or larger than the necessary size (NO in S503), access units are sequentially decoded and stored in the DPB 60 until an IDR picture is detected (S506 to S508). If the access unit is an IDR picture (YES in S508), the process returns to step S503.

The operation to be performed when a display image is omitted from the decoded picture buffer (DPB) 60 in the processes of step S504 and subsequent steps is the same as that in the first embodiment, and a description thereof will not be repeated.

According to the fifth embodiment, even if a DPB buffer size necessary for decoding cannot be allocated in the decoded picture buffer (DPB) 60 in decoding, decoding of an IDR picture can trigger the restart of the decoding process without causing any fatal error in the decoding process.

Sixth Embodiment

Figure 15:
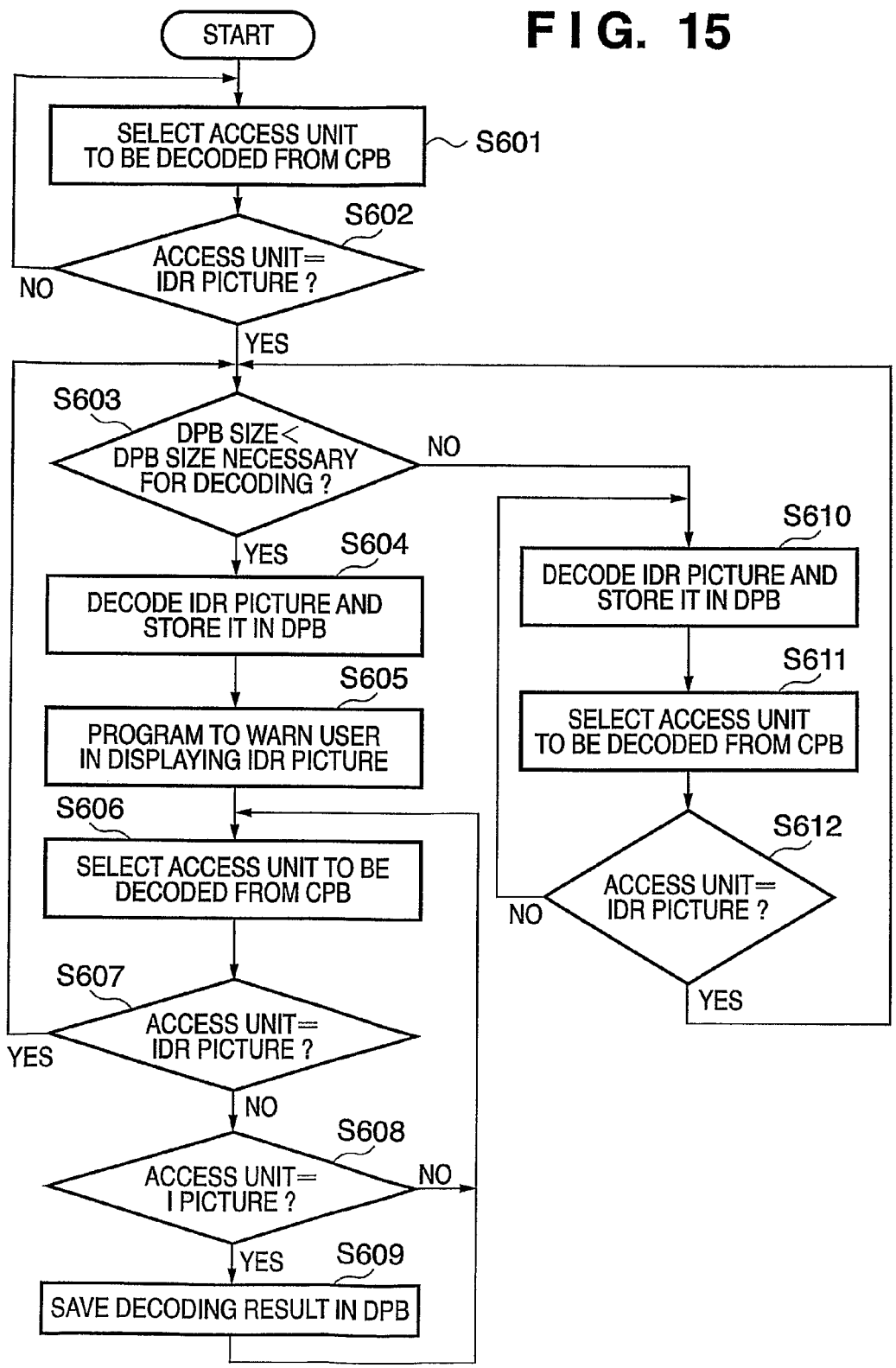
FIG. 15 is a flowchart showing a decoding operation according to the sixth embodiment.

The sixth embodiment in which display of the playback image is updated before the restart of decoding in response to an IDR picture will be described. FIG. 15 is a flowchart of a decoding operation according to the sixth embodiment. Operations in steps S601 to S605 of FIG. 15 are the same as those in steps S501 to S505 of FIG. 14. Operations in steps S610 to S612 are the same as those in steps S506 to S508 of FIG. 14.

After programming generation of a user warning in step S605, the next access unit to be decoded is acquired from a coded picture buffer (CPB) 56 (S606). It is determined whether the access unit is an IDR picture (S607). If the access unit is an IDR picture (YES in S607), the process returns to step S603. If the access unit is not an IDR picture (NO in S607), it is determined whether the access unit is an I picture (S608). If the access unit is an I picture (YES in S608), the I picture is decoded to save the decoding result in a DPB 60 (S609). If the access unit is not an I picture (NO in S608), the process returns to step S606.

The operation to be performed when a display image is omitted from the DPB 60 in step S604 and subsequent steps is the same as that in the first embodiment, and a description thereof will not be repeated.

According to the sixth embodiment, even if a buffer area enough to store a decoded picture cannot be allocated in the decoded picture buffer (DPB) in decoding, decoding of an IDR picture can trigger the restart of the decoding process without causing any fatal error in the decoding process. The display image can be updated by decoding an I picture until the decoding process restarts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-218820, filed Aug. 10, 2006, which is hereby incorporated by reference herein in its entirety.

The invention claimed is:

1. An image decoding apparatus which decodes image data compressed using inter picture predictive encoding, comprising:

a first picture buffer that stores the compressed image data;
   a second picture buffer that stores decoded image data;
   decoding unit that decodes the compressed image data stored in said first picture buffer by referring to image data stored in said second picture buffer, as needed, and stores the decoded image data in said second picture buffer;
   detection unit that detects a free area of said second picture buffer;
   control unit that instructs said decoding unit to interrupt decoding of succeeding pictures regardless of picture type being I, P or B picture type and to delete image data which is in said second picture buffer and is not to be displayed when the free area detected by said detection unit is smaller than a predetermined value; and
   determination unit that determines input of IDR (Instantaneous Decoder Refresh) picture during a period in which decoding operation of said decoding unit is interrupted by said control unit, wherein
   said control unit restarts the decoding operation of said decoding unit from the IDR picture when presence of input of the IDR picture is determined by said determination unit.

2. The apparatus according to claim 1, wherein when the free area is smaller than the predetermined value, said control unit repetitively reads out predetermined image data stored in said second picture buffer.

3. The apparatus according to claim 1, further comprising warning unit that issues a message representing interruption of decoding by said decoding unit.

4. An image decoding apparatus which decodes image data compressed using inter picture predictive encoding and intra picture encoding, comprising:

a first picture buffer that stores the compressed image data;
   a second picture buffer that stores decoded image data;
   decoding unit that decodes the compressed image data stored in said first picture buffer by referring to image data stored in said second picture buffer, as needed, and stores the decoded image data in said second picture buffer, said decoding unit being able to selectively execute a full decoding process mode in which both image data compressed by inter picture predictive encoding and image data compressed by intra picture encoding are decoded, and a selective decoding process mode in which image data compressed by intra picture encoding is decoded but image data compressed by inter picture predictive encoding is not decoded;
   detection unit that detects a free area of said second picture buffer;

control unit that instructs said decoding unit to perform decoding in the selective decoding process mode and to delete image data which is in the second picture buffer and is not to be displayed when the free area detected by said detection unit is smaller than a predetermined value; and determination unit that determines input of IDR (Instantaneous Decoder Refresh) picture during a period in which the selective decoding process mode is performed by said decoding unit, wherein said control unit instructs said decoding unit to decode the compressed image data succeeding to the IDR picture by the full decoding process mode when presence of input of the IDR picture during the period in which the selective decoding process mode is performed is determined by said determination unit.

5. The apparatus according to claim 4, wherein when no image data is stored in said second picture buffer for a predetermined period in the selective decoding process mode, said control unit repetitively reads out image data from said second picture buffer for a predetermined period.

6. The apparatus according to claim 4, further comprising warning unit adapted to issue a message representing switching of said decoding unit to the selective decoding process mode.

7. A method of controlling an image decoding apparatus which decodes image data compressed using inter picture predictive encoding, the image decoding apparatus having a first picture buffer which stores the compressed image data, and a second picture buffer which stores decoded image data, the method comprising:

a decoding step of decoding the compressed image data stored in the first picture buffer by referring to image data stored in the second picture buffer, as needed, and of storing the decoded image data in the second picture buffer;

a detection step of detecting a free area of the second picture buffer;

a control step of instructing said decoding step to interrupt decoding of succeeding pictures regardless of a picture type being an I, B or P picture type and to delete image data which is in said second picture buffer and is not to be displayed when the free area detected in said detection step is smaller than a predetermined value; and a determination step of determining input of IDR (Instantaneous Decoder Refresh) picture during a period in which decoding operation in said decoding step is interrupted by said control step, wherein said control step restarts the decoding operation in said decoding step from the IDR picture when presence of input of the IDR picture is determined in said determination step.

8. The method according to claim 7, wherein in the control step, when the free area is smaller than the predetermined value, predetermined image data stored in the second picture buffer is repetitively read out.

9. The method according to claim 7, further comprising a warning step of issuing a message representing interruption of decoding in the decoding step.

10. A method of controlling an image decoding apparatus which decodes image data compressed using inter picture predictive encoding and intra picture encoding, the image decoding apparatus having a first picture buffer which stores the compressed image data, and a second picture buffer which stores decoded image data, the method comprising:

a decoding step of decoding the compressed image data stored in the first picture buffer by referring to image data stored in the second picture buffer, as needed, and of storing the decoded image data in the second picture buffer, the decoding step being able to selectively execute a full decoding process mode in which both image data compressed by inter picture predictive encoding and image data compressed by intra picture encoding are decoded, and a selective decoding process mode in which image data compressed by intra picture encoding is decoded but image data compressed by inter picture predictive encoding is not decoded;

a detection step of detecting a free area of the second picture buffer;

a control step of designating decoding in the selective decoding process mode in the decoding step and instructing to delete image data which is in the second picture buffer and is not to be displayed when the free area detected in said detection step is smaller than a predetermined value; and a determination step of determining input of IDR (Instantaneous Decoder Refresh) picture during a period in which the selective decoding process mode is performed in said decoding step, wherein said control step instructs said decoding step to decode the compressed image data succeeding to the IDR picture by the full decoding process mode when presence of input of the IDR picture during the period in which the selective decoding process mode is performed is determined in said determination step.

11. The method according to claim 10, wherein in the control step, when no image data is stored in the second picture buffer for a predetermined period in the selective decoding process mode, image data is repetitively read out from the second picture buffer for a predetermined period.

12. The method according to claim 10, further comprising a warning step of issuing a message representing switching to the selective decoding process mode in the decoding step.

13. A non-transitory computer-readable storage medium characterized by storing a program which causes a computer to execute a control method of controlling an image decoding apparatus which decodes image data compressed using inter picture predictive encoding, the image decoding apparatus having a first picture buffer which stores the compressed image data, and a second picture buffer which stores decoded image data, the method comprising:

a decoding step of decoding the compressed image data stored in the first picture buffer by referring to image data stored in the second picture buffer, as needed, and of storing the decoded image data in the second picture buffer;

a detection step of detecting a free area of the second picture buffer;

a control step of instructing said decoding step to interrupt decoding of succeeding pictures regardless of a picture type being an I, B or P picture type and to delete image data which is in said second picture buffer and is not to be displayed when the free area detected in said detection step is smaller than a predetermined value; and a determination step of determining input of IDR (Instantaneous Decoder Refresh) picture during a period in which decoding operation in said decoding step is interrupted by said control step, wherein said control step restarts the decoding operation in said decoding step from the IDR picture when presence of input of the IDR picture is determined in said determination step.

* * * * *